G. P. KINGSBURY.
HOLDER FOR ERASING MATERIAL.
APPLICATION FILED NOV. 11, 1907.
961,141.  Patented June 14, 1910.
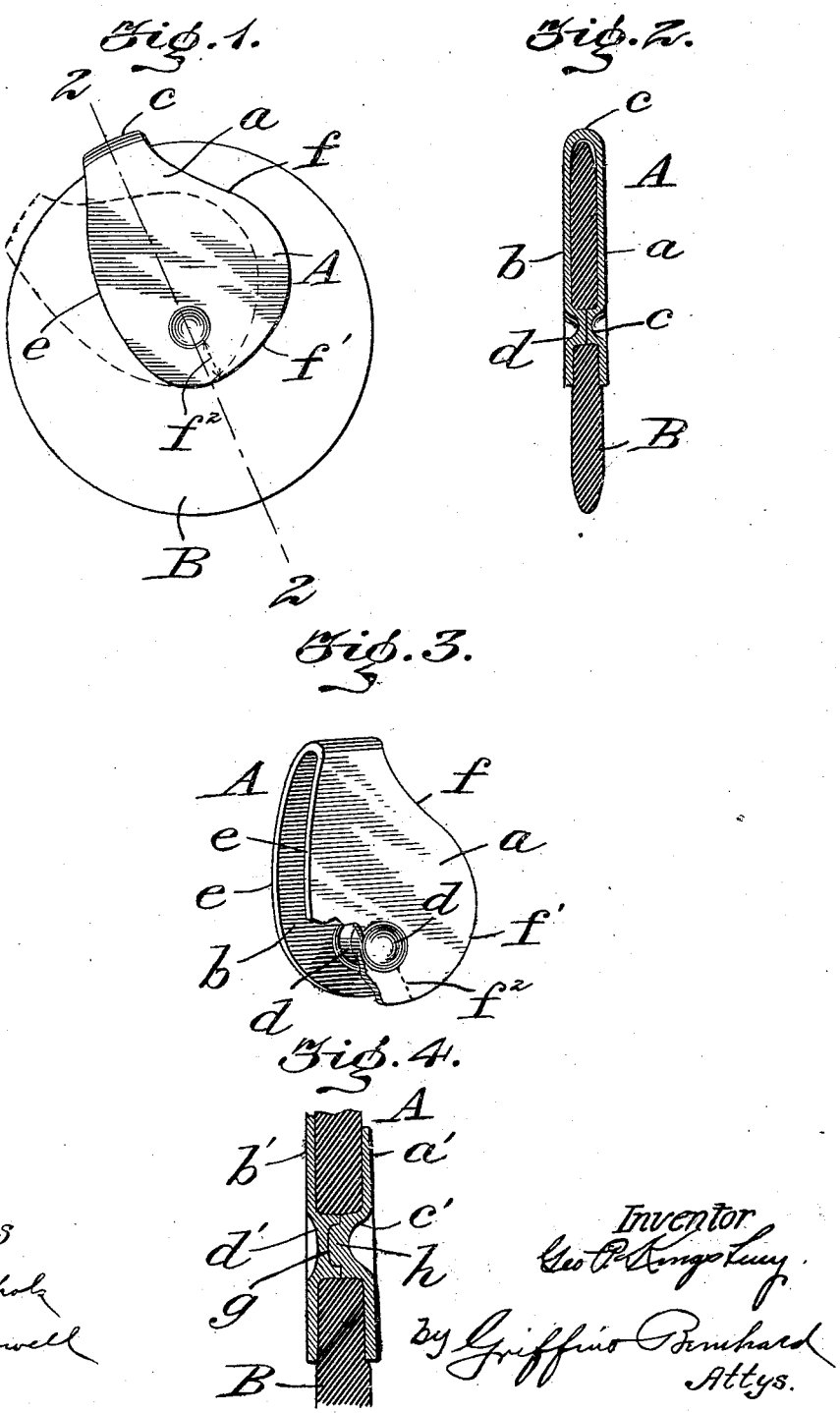

UNITED STATES PATENT OFFICE.

GEORGE P. KINGSBURY, OF SCRANTON, PENNSYLVANIA.

HOLDER FOR ERASING MATERIAL.

961,141.  Specification of Letters Patent.  Patented June 14, 1910.

Application filed November 11, 1907. Serial No. 401,615.

*To all whom it may concern:*

Be it known that I, GEORGE P. KINGSBURY, a citizen of the United States, residing in Scranton, county of Lackawanna, and State of Pennsylvania, have invented a certain new and useful Holder for Erasing Material, of which the following is a specification.

This invention is a holder for conveniently handling erasive material, such as a disk composed of rubber or rubber compounds, the same being now employed largely for removing ink impressions and pencil marks from paper, and other materials.

In the prior art, one of the most common forms of erasers, used largely in connection with typewritten matter, consists of a disk of erasive material, usually of rubber compound, two metallic plates applied to the respective sides of the aforesaid disk, and a rivet passing through the three disks for permanently uniting the metallic disks to the rubber disk, said metallic disks serving, mainly, to stiffen the rubber disk when the device is rubbed forcibly on the paper. Such prior devices are objectionable from at least two standpoints; first, the rubber disk soon wears down to the edges of the metallic disks, making it necessary to forcibly remove the metallic disks by prying them off the rivet, in which case the rubber erasive material, while still capable of limited use, is pliable and flimsy by reason of the absence of the metal reinforcing disks; and, second, the detached metal parts comprising the two disks and rivet are useless, and must be thrown away.

The present invention overcomes the foregoing objections for the reasons; first, that the new holder enables a rubber eraser to be worn down to a much greater extent than heretofore, or until said eraser becomes practically of no avail, the holder in the meanwhile serving to reinforce and stiffen said rubber eraser; secondly, the holder is detachable readily from the rubber eraser; and, thirdly, the holder is adapted to be adjusted easily and quickly in place over new rubber erasers, thus securing economy in the manufacture of erasers, for the reason that it is not necessary to supply a holder with each rubber erasive disk.

One part of my invention comprises a holder having side members, the width of each member decreasing toward the point of attachment of an erasive rubber member to the holder. Preferably, each side member is provided with a curved edge, the radius of which lessens as it approaches the point where the rubber disk is to be connected to the holder. Such construction permits the rubber eraser to be turned in the holder, and to be used until it wears down to that edge of the holder which is of the shortest radius, the holder serving to stiffen and reinforce the eraser during the whole period of its use.

The invention consists, further, of a holder in the form of a spring metal yoke or clip adapted to be slipped over an erasive disk. Preferably, the holder consists of parallel members which are united at one end, each of said members having one edge curved substantially as described.

The holder is provided with means on its members for engagement with an opening in an erasive disk, said means being preferably integral with said members. In one practical form of construction, each member is pressed or punched to produce an offset, said offsets being adapted to register, and thereby produce a pivot on which the rubber eraser may be turned. Another construction contemplates an interlocking connection between the registering offsets.

In the accompanying drawings, I have illustrated different practical embodiments of the invention, but the construction shown therein is to be understood as illustrative only, and not as defining the limits of the invention.

Figure 1 is a side elevation showing my new holder in connection with a rubber erasive disk or member, the dotted lines illustrating one of the numerous positions to which the holder may be adjusted relative to the erasive disk. Fig. 2 is a cross section on the line 2—2 of Fig. 1. Fig. 3 is a detail perspective view of the holder, one side member thereof being partly broken away, the rubber eraser being omitted. Fig. 4 is a detail cross section through a portion of the holder and a rubber eraser, said view showing another form of means for attaching an eraser to said holder.

A designates a holder, herein shown in the form of a metallic yoke or clip having means for engagement with an eraser B.

It is usual in the art to provide a circular or disk like eraser composed of rubber, or rubber compounds, said eraser having a central opening or eye. The holder A is constructed in a peculiar way so that it may be applied to said eraser, B, said holder engaging firmly with the eraser and being detachable therefrom. As shown, the holder consists of members, a, b, connected at one end by an intermediate portion, c. Said holder is made, preferably, by stamping it from a single piece of sheet metal, and thereafter doubling or folding the metal upon itself so as to produce the members and the connecting portion, the holder being substantially yoke shaped in cross section. It is to be understood, however, that the invention is not limited to the described mode of manufacture, for the reason that the holder may be made in any other suitable way.

The members a, b, are parallel practically throughout their length, and in one form of construction said members are provided with a means adapted for engagement with the rubber eraser, B. As shown in Figs. 2 and 3, said members a, b, are provided with offsets c, d, respectively, and said offsets are formed at corresponding points in the members, whereby the offsets will register with each other. Said offsets form the pin, stud or rivet adapted to enter the opening in the eraser B, and the offsets thus constitute means for attaching the holder, A, to the eraser, B, the offsets serving the further purpose of a pivot on which the eraser, B, may be rotated, or the holder, A, may be adjusted relative to said eraser to a number of positions, one of which is indicated in dotted lines in Fig. 1.

It is preferred to make the holder, A, of spring metal, whereby the inherent elasticity of the members, a, b, will keep the offsets, c, d, in engagement or contact with each other. This construction causes the holder to retain itself in place on the eraser B, but it is evident that the members, a, b, may be slightly pressed apart for the purpose of disengaging the offsets, c, d, from the opening in the eraser, thus enabling said eraser, when worn, to be disconnected from the holder. A most important advantage of this construction is that the holder may be easily and quickly detached from a worn eraser, and in like manner applied to a new eraser, thereby securing economy in the manufacture of the eraser, for the reason that it is necessary to only produce the rubber disk B, the holder being made and sold as a separate article adapted for use interchangeably with any number of rubber erasers.

Another important part of the present invention is a particular construction of the holder, whereby the rubber eraser can be worn down practically to the point where the holder engages with the central eye or opening of said eraser. In one form of construction contemplated by the invention, each member or plate a, b, is made of a peculiar shape, represented in Figs. 1 and 3. From the connecting portion, c, the plate or member increases in width to a certain point and then decreases toward the rivet or stud by which the eraser is connected to the holder. As shown, each member is provided with an edge, e, which is slightly curved from the connecting portion, c, to a point below the offset of the member, whereas the other edge, f, of said member is so curved that its radius changes constantly, substantially, relative to the offset or the rivet.

It will be seen that the edge, f, sweeps at f' below the offset or rivet and unites with, or merges into, the edge, e, and from the radius indicated by the dotted line, $f^2$, the edge f, f', is of gradually increasing radius until it joins the connecting portion, c.

It will be understood that each member, a, b, is constructed in the peculiar manner heretofore described, although the invention is not strictly confined to the particular shape of the members shown in Figs. 1 and 3 of the drawings, said figures showing one practical form of the invention, the same consisting of side members the width of which decreases toward the point where an eraser is to be connected to the holder. It is to be understood, therefore, that the right is reserved to modify the proportions and shape of the holder within the limits of the annexed claims.

In using the holder in connection with a rubber eraser, the members, a, b, are sprung apart sufficiently for the eraser to be introduced between them, the offsets of said members entering the eye of said eraser. The holder and the eraser are thus connected securely together, but it is evident that the holder and the eraser may have relative movement one to the other, whereby the holder may be partly turned on the eraser to assume the dotted line position of Fig. 1, the connecting portion, c, serving as an abutment to receive the pressure of the finger in moving the holder relative to the eraser. Again, the eraser may be turned on the rivet formed by the offsets, c, d.

The article is used by grasping the holder and forcibly applying the eraser, B, to the work. When one portion of said eraser wears down, it may be turned part way around in the holder, thus bringing a fresh edge into position for use, and these operations may be repeated until the eraser becomes worn away, practically. During the whole period of use of the eraser, the holder serves to strengthen and reinforce said eraser, and the article may be used until the edge portion of the eraser is worn away practically, to the shortest radius, $f^2$, of the holder. It is evident that the use of my new holder enables an eraser to be rubbed down until it becomes of very small diameter, thus using up, practically, the whole of the eraser material, and during such period of use the holder stiffens and reinforces the pliable rubber eraser.

It is not intended to confine the invention strictly to attaching means integral with the member of the holder, but it is preferred, for economy in manufacture, to make the attaching means integral with said members by pressing the offsets, c, d, in the blank when it is stamped from sheet metal.

Fig. 4 shows another construction of the attaching means for the holder, wherein the members, a', b', are provided with offsets, c', d', said offset, d', having a socket, g, into which is adapted to fit the stud, h, of the offset, c', thus securing an interlocking connection between the offsets of the members. It is evident that the members may be separated so as to withdraw the stud, h, of the offset, c', from the socket, g, of the offset, d', thus permitting of the ready insertion and removal of the eraser. The construction shown in said Fig. 4 is intended primarily to preclude spreading of the parallel plates a, b, under the pressure of the eraser disk B when the device is used for rubbing type written matter from a sheet of paper. The pressure of the disk B, when erasing, is borne partly by the offsets c', d', and by the plates a, b, and by fitting the stud h of one offset into the socket g of the other offset, the parts are locked together so as to minimize the tendency of the plates to spread.

Having thus fully described the invention, what I claim as new, and desire to secure by Letters Patent is:—

1. As a new article of manufacture, an eraser holder composed of a one-piece blank of sheet metal folded upon itself and producing substantially parallel and flat plates, each plate having a substantially spiral edge extending from the inner end thereof toward the connection between said plates, said holder being provided with eraser-supporting means adjacent to the shorter radii of said curved edges of the plates.

2. As a new article of manufacture, an elastic holder for erasers of the class described composed of sheet metal folded upon itself and producing substantially flat plates united at one end by a bridge integral therewith, and pivotal means integral with the respective plates for attaching an eraser thereto near the other ends of the plates, said pivotal means of the plates being insertible into a central aperture of the eraser, whereby said eraser is connected rotatably to the elastic holder.

3. An eraser holder composed of sheet metal doubled upon itself and producing companion plates united at one end by a transverse bridge integral with the plates, said plates being provided near one end with means for rotatably securing an eraser thereto, one edge of each plate being provided with a spiral curve extending from the eraser attaching means toward the bridge which connects the plates.

4. In a device of the class described, a one-piece sheet metal holder comprising substantially flat and parallel plates united at one end by an integral transverse portion, one edge of each plate being curved continuously and on a decreasing radius from said integral portion toward a point of attachment of an eraser to the holder.

5. An expansible holder comprising connected and parallel plates provided with means integral therewith for rotatably securing an eraser in operative position between them.

6. An eraser holder comprising substantially flat plates connected together, and studs on the opposing faces of said plates, said studs being in register with each other and coöperating to rotatably support an eraser when positioned between said plates.

7. An eraser holder comprising connected and substantially flat plates adapted to be spread sidewise for the insertion and removal of a centrally apertured disk composed of erasive material, and studs extending from the inner faces of the respective plates and disposed in coaxial relation to each other, whereby the studs are adapted to enter the central aperture of said disk and the latter is rotatably connected to said holder.

8. An eraser holder comprising substantially flat plates, each having a stud extending from the inner face thereof, one edge of each member being curved toward the stud, the radius of said curvature decreasing toward the stud.

9. A spring metal eraser holder comprising parallel plates, each provided with a stud, the studs of said plates operating to rotatably support an interposed disk eraser and said studs having interlocking engagement with each other against a tendency to separate under stress exerted thereon in a direction at right angles to the axes of the studs.

10. An eraser holder comprising substantially parallel plates operating to laterally support an interposed eraser, and studs disposed transversely to the plates, near one edge thereof, for rotatably supporting said eraser, each plate having an edge the curvature of which increases in radius from the point nearest said stud outwardly toward the opposite edge of the plate.

11. A device of the class described, consisting of a disk-rubber having a shoe pivotally mounted thereupon, said shoe consisting of two lobes having substantially spiral edges passing from a point near the edge of said disk, extending inwardly and passing near the center of said disk.

12. An eraser consisting of a disk-rubber having a shoe pivoted thereto, said shoe consisting of two lobes the outlines whereof form substantially closed figures on the sides of said disk, the edges of said lobes passing gradually inwardly in a continuous line from a point near the edge of said disk to a point near the center thereof.

13. An eraser consisting of a disk-rubber, a shoe consisting of two lobes forming substantially closed curved figures lying substantially within the limits of said disk and pivoted eccentrically to the center of said disk.

14. A device of the class described, consisting of a disk rubber having a shoe pivoted thereto for holding the same, said shoe consisting of two superposed lobes connected by an integral bar and receiving the said disk, said shoe having a continuous curved edge extending inwardly gradually from a point at the edge of said bar to a point near the pivot of said disk.

In testimony whereof I have signed my name to this specification in the presence of two subscribing witnesses.

GEORGE P. KINGSBURY.

Witnesses:
W. M. CURRY,
J. E. LOUIS.